US012584567B2

(12) United States Patent
Rasmussen et al.

(10) Patent No.: US 12,584,567 B2
(45) Date of Patent: Mar. 24, 2026

(54) CONTROL VALVE WITH A MEASURING CHAMBER

(71) Applicant: Frese A/S, Slagelse (DK)

(72) Inventors: Christian Bo Rasmussen, Odense (DK); Jussi Richart Foltmar Svendsen, Dalmose (DK)

(73) Assignee: Frese A/S, Slagelse (DK)

( * ) Notice: Subject to any disclaimer, the term of this patent is extended or adjusted under 35 U.S.C. 154(b) by 0 days.

(21) Appl. No.: 18/693,388

(22) PCT Filed: Sep. 20, 2022

(86) PCT No.: PCT/EP2022/076033
§ 371 (c)(1),
(2) Date: Mar. 19, 2024

(87) PCT Pub. No.: WO2023/046656
PCT Pub. Date: Mar. 30, 2023

(65) Prior Publication Data
US 2024/0392892 A1     Nov. 28, 2024

(30) Foreign Application Priority Data

Sep. 21, 2021     (EP) ...................................... 21198023

(51) Int. Cl.
*F16K 37/00* (2006.01)
*F16K 1/52* (2006.01)
(Continued)

(52) U.S. Cl.
CPC ............ *F16K 37/005* (2013.01); *F16K 1/526* (2013.01); *F16K 11/085* (2013.01); *G05D 7/0113* (2013.01)

(58) Field of Classification Search
CPC ...... F16K 11/085; F16K 37/005; F16K 1/526; F24D 19/1036; G05D 7/0113; G05D 7/0106
See application file for complete search history.

(56) References Cited

U.S. PATENT DOCUMENTS

| | | | | |
|---|---|---|---|---|
| 1,529,371 A | * | 3/1925 | Neusome | ............ F16K 11/0833 137/625.16 |
| 7,735,514 B2 | * | 6/2010 | Marstorp | ............. G05D 7/0126 137/637.4 |
| 2012/0053860 A1 | * | 3/2012 | Wheater | ................... G01F 1/34 702/50 |

FOREIGN PATENT DOCUMENTS

| | | |
|---|---|---|
| DE | 10062681 A1 | 7/2002 |
| EP | 2894536 A1 | 7/2015 |

(Continued)

OTHER PUBLICATIONS

International Search Report and Written Opinion, dated Jan. 4, 2023, 7 pages, issued in International Application No. PCT/EP2022/076033.

*Primary Examiner* — Atif H Chaudry
(74) *Attorney, Agent, or Firm* — AVEK IP, LLC

(57)     ABSTRACT

A control valve includes a valve housing with an inlet, an outlet, and a fluid path extending therebetween. An adjustable first valve body is provided for adjusting a first flow opening of the fluid path. A first channel is debouching into the fluid path at a first location on a stream-wise first side of the first flow opening and a second channel is debouching into the fluid path at a second location on a stream-wise opposite side of the first flow opening. A measuring chamber is also provided. A second valve body is movable between two positions and provides in one position fluid communication between the first channel and the measuring chamber, (Continued)

and provides in a second position fluid communication between the second channel and the measuring chamber.

26 Claims, 4 Drawing Sheets

(51) Int. Cl.
  F16K 11/085 (2006.01)
  G05D 7/01 (2006.01)

(56) References Cited

FOREIGN PATENT DOCUMENTS

| | | | |
|---|---|---|---|
| EP | 3708884 | A1 | 9/2020 |
| WO | 2009135490 | A2 | 11/2009 |
| WO | 2014044282 | A2 | 3/2014 |

* cited by examiner

CONTROL VALVE WITH A MEASURING CHAMBER

CROSS-REFERENCE TO RELATED APPLICATIONS

This application is the national phase of, and claims priority to, International Application No. PCT/EP2022/076033 filed Sep. 20, 2022, which claims priority to European Application No. 21198023.0, filed Sep. 21, 2021.

BACKGROUND

The invention relates to a control valve comprising a valve housing with an inlet for connection with a fluid source and an outlet for connection with a fluid recipient, a fluid path extending from the inlet to the outlet, an adjustable first valve body at the fluid path for adjusting a first flow opening of the fluid path, a first channel debouching into the fluid path at a first location on a stream-wise first side of the first flow opening and a second channel debouching into the fluid path at a second location on a stream-wise opposite side of the first flow opening, and at least one measuring chamber.

It should be noted that as used herein the term "debouching" does not indicate that a flow exists from e.g. a channel "debouching" e.g. into a fluid path. The term "debouching" merely indicates that an open fluid communication exists between such channel and such fluid path.

A control valve of the invention may e.g. be used in heating and cooling systems in applications with Fan Coil Units, Chilled Beams or other terminal unit applications.

A control valve comprising features corresponding to the above mentioned is well known, e.g. from EP 3 708 884 A1, which relates to a valve with an amount control arrangement for dynamic control of the amount of liquid flowing through the valve and a differential pressure maintaining arrangement for maintaining a substantially constant differential pressure across the amount control arrangement. Though not mentioned as such, a first and a second channel debouching into the fluid path of this known valve are seen extending to a respective, so-called PT-plug. PT-plugs are well known in the art and are used for inserting a cannula to measure e.g. the pressure, in the measuring chamber connected to the respective channel.

By the valve according to EP 3 708 884 A1 it is thus possible to measure the pressure, usually denoted P1, at the inlet of the valve and the pressure, usually denoted P3, at the outlet of the valve. Thus, it is not possible, by this known valve, to measure the pressure, usually denoted P2, between the amount control arrangement and the differential pressure maintaining arrangement. A way of providing for measurement of P2 in addition to P1 and P3 is to provide an additional PT-plug with a third channel debouching into the fluid path at a relevant location. Such solution would however entail a bulky construction of the valve.

SUMMARY

It is an object of the invention to provide a compact valve with versatile properties.

This is obtained by a valve as mentioned by way of introduction, comprising a second valve body movable between a first position and a second position whereby in the first position the second valve body provides fluid communication between the first channel and the first measuring chamber, and in the second position the second valve body provides fluid communication between the second channel and the first measuring chamber. Hereby is obtained that the measuring chamber will be subject to properties, such as pressure, corresponding to different stream-wise sides of the first opening depending on the position of the second valve body.

In an embodiment the first measuring chamber is a sealed chamber apart from a passage which in the first position is in fluid communication with the first channel and in the second position is in fluid communication with the second channel, said passage having a diameter smaller than a diameter of the first measuring chamber.

In an embodiment the sealed chamber is sealed by an elastomeric element penetrate-able by a cannula and resealing upon retraction of such cannula.

In an embodiment the second valve body may be rotatable around an axis between the first position and the second position. The provision of the second valve body to be rotatable around an axis may provide for the first position and the second position being two different angular positions of the second valve body within a single axial position of the second valve body.

In a further embodiment the second valve body may comprise at least a part of the first measuring chamber and a passage extending from the first measuring chamber to a mouth of the passage in an exterior surface part of the second valve body, said mouth being in the first position of the second valve body in fluid communication with the first channel and said mouth being in the second position of the second valve body in fluid communication with the second channel.

In another embodiment the mouth may be eccentrically provided at an axial end of the second valve body, said axial end of the second valve body being accommodated in an external recess, e.g. a bore, in the valve housing, a first annular sealing member sealing a major space between the external recess and the axial end of the second valve body, a second annular sealing member surrounding an exit of one of the first channel and the second channel, said exit debouching into the external recess, and said second annular sealing member sealing a minor space between the external recess and the axial end of the second valve member at said exit, said minor space being sealed relative to the major space, whereby in one of the first and the second position of the second valve body the mouth is outside the minor space but within the major space and in the other of the first and the second position of the second valve body the mouth is within the minor space. In an embodiment the first annular sealing member is an O-ring. In an embodiment the second annular sealing member is an O-ring.

In a further embodiment the mouth may be eccentrically provided at an axial end of the second valve body, and the axial end of the second valve body may be abutting a sealing member comprising a part of the first channel and a part of the second channel for the axial end of the second valve body to abut sealing against the sealing member the mouth being aligned with the part of the first channel in the first position of the second valve body and the mouth being aligned with the part of the second channel in the second position of the second valve body. The sealing member may be of an elastic material, such as artificial or natural rubber.

In an embodiment the mouth may be provided in an end face of the second valve body. In an embodiment the second valve body may comprise a circular-cylindrical part and the end face may be a plane end face of the circular-cylindrical part extending perpendicular the axis.

In an embodiment the first annular sealing member is extending around a circular-cylindrical part of the second valve body.

In an embodiment an adjustable third valve body may be provided at the fluid path for adjusting a second flow opening of the fluid path at a flow-wise different location than the first flow opening.

In a further embodiment one of the first valve body and the third valve body is adapted to maintain a generally constant pressure difference over the other of the first valve body and the third valve body. In this way said one of the first valve body and the third valve body may provide for maintaining a differential pressure as part of a differential pressure maintaining arrangement for the other of the first valve body and the third valve body, while said other of the of the first valve body and the third valve body may provide for amount control as part of an amount control arrangement for e.g. dynamic control of the amount of liquid flowing through the valve.

In an embodiment one of the first location and the second location may be placed between the first flow opening and the second flow opening.

In an embodiment a third channel may debouche into the fluid path at a third location on a flow-wise different side of the first and the second flow opening than the first and the second location, said third channel being in fluid communication with a second measuring chamber. The provision of two different measuring chambers provides e.g. for comparison of properties of a flow of a fluid at different locations in the valve.

In an embodiment one of the first valve body and the third valve body may be a pressure maintaining valve body adapted to maintain a constant pressure difference over the other of the first valve body and the third valve body, said other of the first valve body and the third valve body being a flow adjusting valve body, wherein one of the first location and the second location is placed between the first flow opening and the second flow opening, wherein a third channel debouches into the fluid path at a third location on a flow-wise different side of the first and the second flow opening than the first and the second location, said third channel being in fluid communication with a second measuring chamber, and wherein the second of the first location and the second location is placed on a stream-wise opposite side of said pressure maintaining valve body relative to said one of the first location and the second location, and the third location is placed on a stream-wise opposite side of the flow adjusting valve body relative to said one of the first location and the second location.

WO 2009/135490 A1 and the above mentioned EP 3 708 884 A1, both incorporated herein by reference, relates to control valves and both disclose valves that comprise a housing with a valve insert, which has an amount control arrangement for variable control of the amount of liquid flowing through the valve and a differential pressure maintaining arrangement, often denoted a differential pressure governor or a differential pressure regulator, for maintaining a constant differential pressure across the amount control arrangement. The differential pressure maintaining arrangement comprises a rolling diaphragm and a cup-shaped valve member movable together along an axis of the valve, the valve member and diaphragm setting themselves in a balance between an upstream pressure on the one hand and a down-stream pressure as well as a spring force on the other hand. The amount control arrangement is adapted so that the flow amount through the valve can be dynamically adjusted within an independently pre-set flow amount range. An inner, cylindrical valve member is co-axial with a rotatable outer, cylindrical valve member, both valve members having a circumferentially extending cut-out, the pre-setting of the flow amount range being established by manual rotation of one valve member in relation to the other to provide a varying overlap of the cut-outs and thus a varying pre-set opening area. The valve members are furthermore movable together in the axial direction to vary the pre-set opening area provided by the circumferential overlap of the cut-outs, the valve members being connectable with an actuator to provide the dynamic flow amount adjustment by automatically controlling the common axial position of the valve members.

The pressure maintaining valve body may be provided by a cup-shaped valve member attached to a rolling diaphragm and a spring, such as a helical spring, to be balanced by the force of the spring and a back pressure acting on the rolling diaphragm.

The flow adjusting valve body may be attached to a shaft axially displaceable by activation from the outside of the valve housing for adjustment of the corresponding flow opening.

The back pressure acting on the rolling diaphragm may be provided by fluid pressure at the inlet acting through a capillary channel extending through part of the shaft.

The flow adjusting valve body may comprise a rotatable inner, cylindrical valve member co-axial with an outer, cylindrical valve member, both cylindrical valve members having a circumferentially extending cut-out, a pre-setting of the flow amount range being established by manual rotation of one valve member in relation to the other to provide a varying overlap of the cut-outs and thus a varying pre-set opening area.

For further details regarding possible practical arrangements of an amount control arrangement and a differential pressure maintaining arrangement reference is made to the above-mentioned WO 2009/135490 A1 and EP 3 708 884 A1.

In an embodiment the first measuring chamber may be closed by at least one flexible body of an elastomeric material. Access to the first measuring chamber may be obtained by inserting a cannula through the flexible body.

In an embodiment the second valve body may be rotationally fixed to a rotatable measuring plug extending from the valve housing.

In an embodiment the first measuring chamber may be closed by at least one flexible body of an elastomeric material and said at least one flexible body may be accommodated in the rotatable measuring plug.

In an embodiment the rotatable measuring plug may be provided with an engagement section for engagement with a tool for rotating the rotatable measuring plug.

In an embodiment the second valve body may be rotatably fixed to a rotatable measuring plug that per se may be rotatably fixed to the valve housing one or more flexible bodies being accommodated between the second valve body and the rotatable measuring plug, said rotatable measuring plug comprising an engagement section such as a profiled passage for engagement with e.g. a hexagon key said passage providing for insertion of e.g. a cannula through the passage and the flexible body/-ies into the first measuring chamber.

BRIEF DESCRIPTION OF THE DRAWINGS

In the following the invention will be explained in further detail by way of examples of embodiments having reference to the schematic drawings, in which.

DETAILED DESCRIPTION

Figure 1:
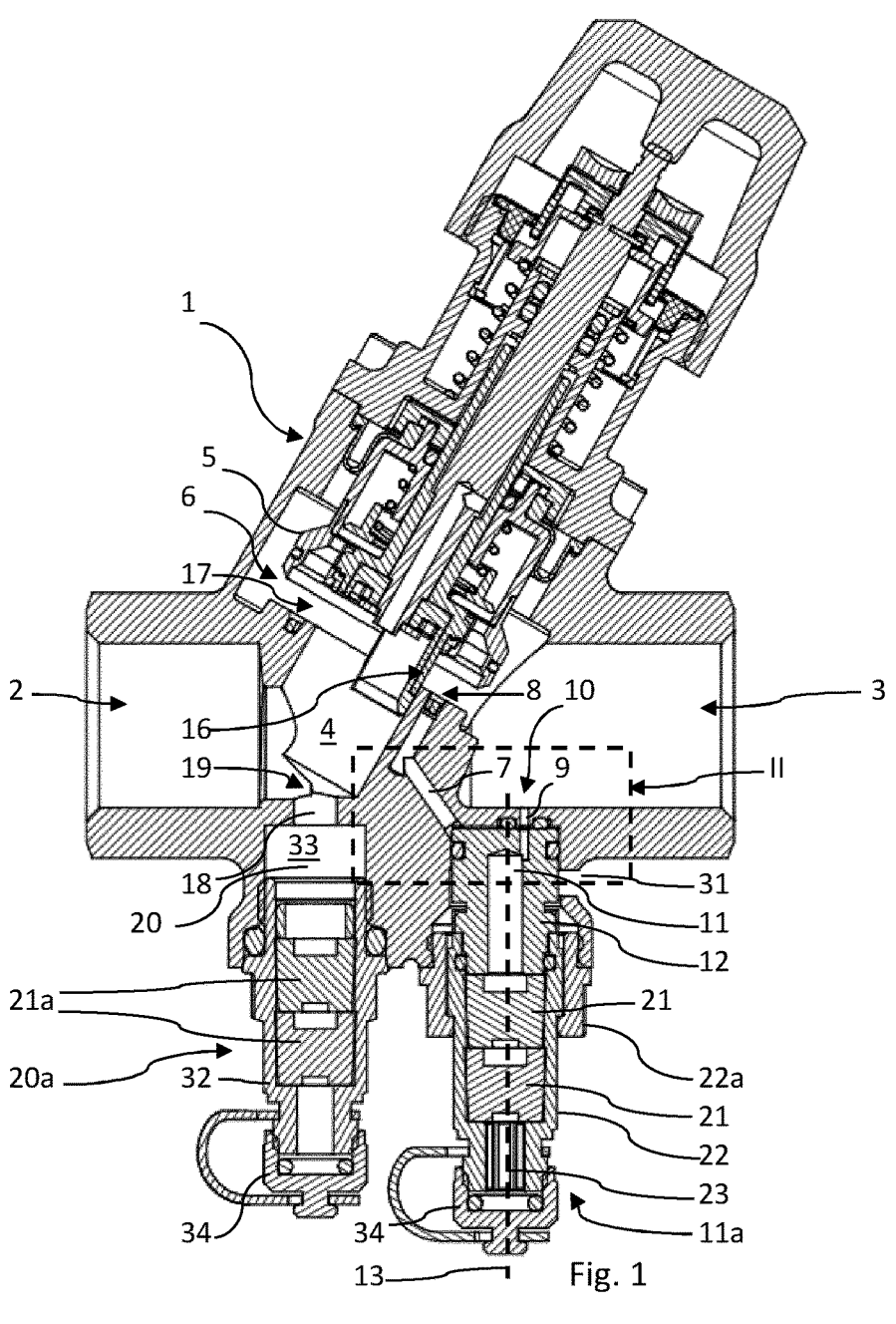
FIG. 1 shows a section through a first embodiment of a valve according to the invention showing a second valve body in a second position.

The embodiments of a control valve shown in the figures respectively comprise a valve housing 1, 1' with an inlet 2 for connection with a fluid source and an outlet 3 for connection with a fluid recipient. A fluid path 4 is extending from the inlet 2 to the outlet 3. An adjustable first valve body 5 is provided at the fluid path 4 for adjusting a first flow opening 6 of the fluid path 4. A first channel 7, 7' is debouching into the fluid path 4 at a first location 8 on a stream-wise first side of the first flow opening 6, and a second channel 9, 9' is debouching into the fluid path 4 at a second location 10 on a stream-wise opposite side of the first flow opening 6. Further a measuring chamber 11 is provided. The measuring chamber 11 is provided in a so-called PT-plug 11a that provides for measuring e.g. pressure inside the control valve as will be explained below.

Further the control valves shown each comprises a second valve body 12, 12' movable between a first position and a second position whereby in the first position the second valve body 12, 12' provides fluid communication between the first channel 7, 7' and the measuring chamber 11, and in the second position the second valve body 12, 12' provides fluid communication between the second channel 9, 9' and the measuring chamber 11.

In each of the embodiments shown in the figures the second valve body 12, 12' is rotatable around an axis 13 between the first position and the second position. The provision of the second valve body to be rotatable around an axis provides for the first position and the second position being two different angular positions of the second valve body 12, 12' within a single axial position of the second valve body 12, 12'.

In each of the embodiments shown in the figures the second valve body 12, 12' comprises a part of the measuring chamber 11 and a passage 14. The passage 14 is extending from the measuring chamber 11 to a mouth 15, 15' of the passage in an exterior surface part of the second valve body 12, 12'. The mouth 15, 15' is in the first position of the second valve body 12, 12' (FIG. 3 and FIG. 6, respectively) in fluid communication with the first channel 7, 7', and in the second position of the second valve body 12, 12' (FIG. 1 and FIG. 4, respectively) the mouth 15, 15' is in fluid communication with the second channel 9, 9'.

Figure 2:
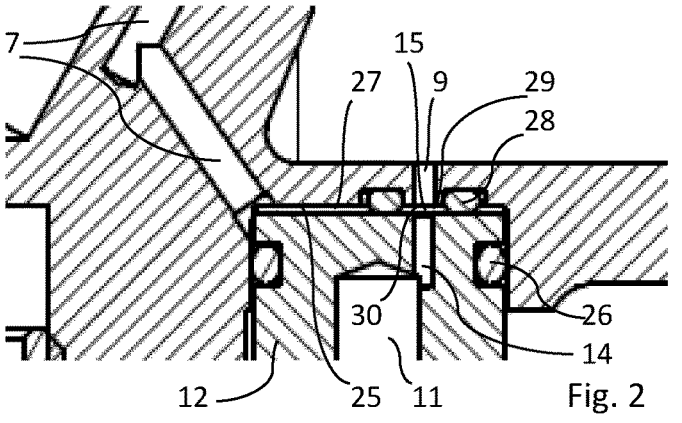
FIG. 2 is an enlarged view of a part of FIG. 1 indicated by II.
Figure 3:
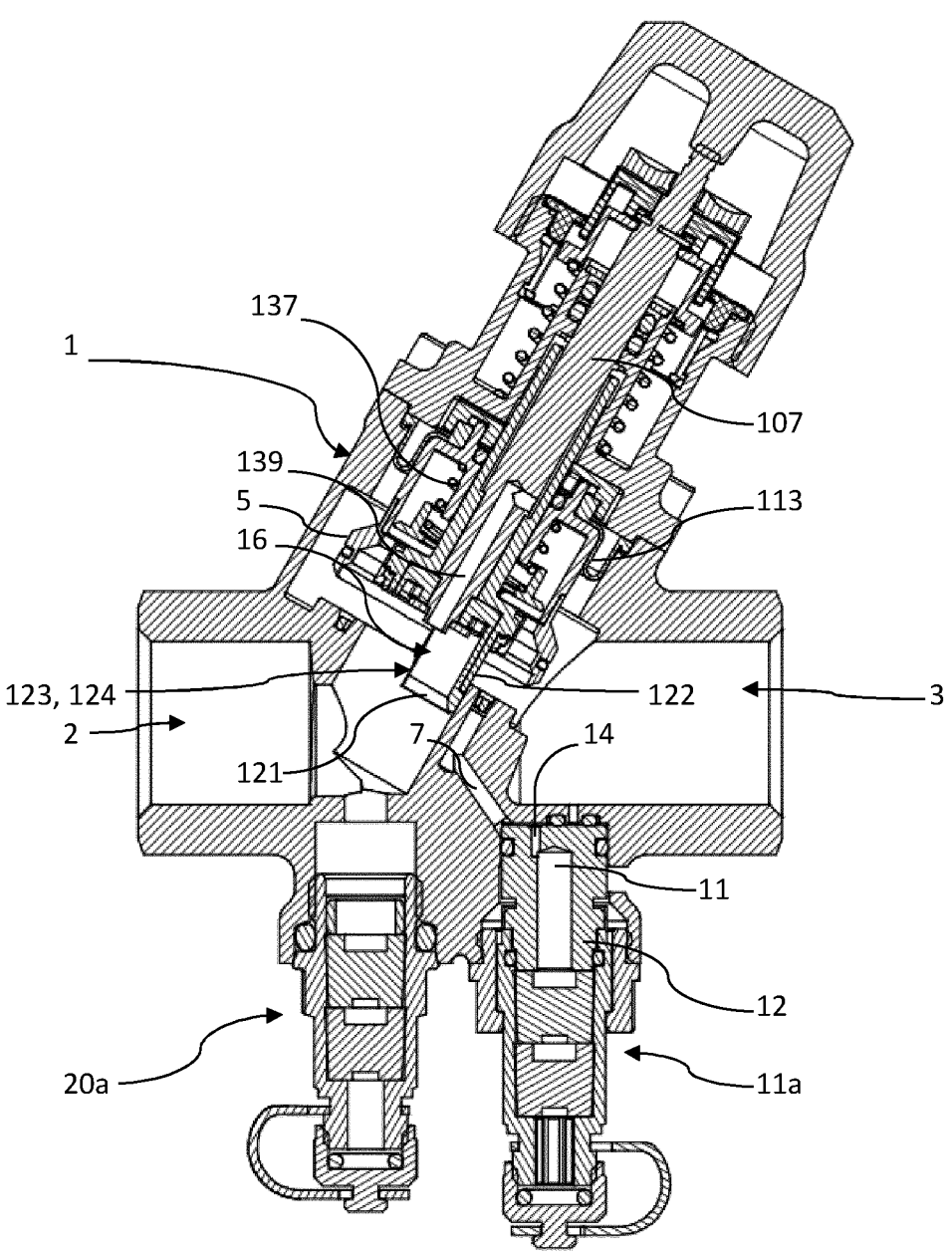
FIG. 3 shows a section through the first embodiment of a valve according to the invention showing the second valve body in a first position.

In the embodiment shown in FIGS. 1 to 3, the mouth 15 is eccentrically provided at an axial end of the second valve body 12. The axial end of the second valve body 12 is accommodated in an external recess 25 in the valve housing 1. A first annular sealing member 26 positioned in a groove in a circle-cylindrical surface part of the second valve body

12 is sealing a major space 27 between the external recess 25 and the axial end of the second valve body 12. A second annular sealing member 28 is surrounding an exit 30 in the external recess 25. The second channel 9 is debouching into the external recess 25 through the exit 30. The second annular sealing member 28 is sealing a minor space 29 between the external recess 25 and the axial end of the second valve member 12 at said exit 30. Thereby in the first position of the second valve body 12 the mouth 15 is outside the minor space 29 but within the major space 27 and in the second position of the second valve body 12 the mouth 15 is within the minor space 29. The minor space 29 is isolated by sealing from the major space 27 due to the second annular sealing member 28. Thus, when the mouth 15 is inside the minor space 29, the mouth 15 is isolated from the (remaining part of the) major space 27. In the embodiment shown the first annular sealing member 26 and the second annular sealing member 28 are O-rings. Thus, in the first position of the second valve body 12 the measuring chamber 11 is through the passage 14 connected to the first channel 7 and in the second position of the second valve body 12 the measuring chamber 11 is through the passage 14 connected to the second channel 9.

Figure 4:
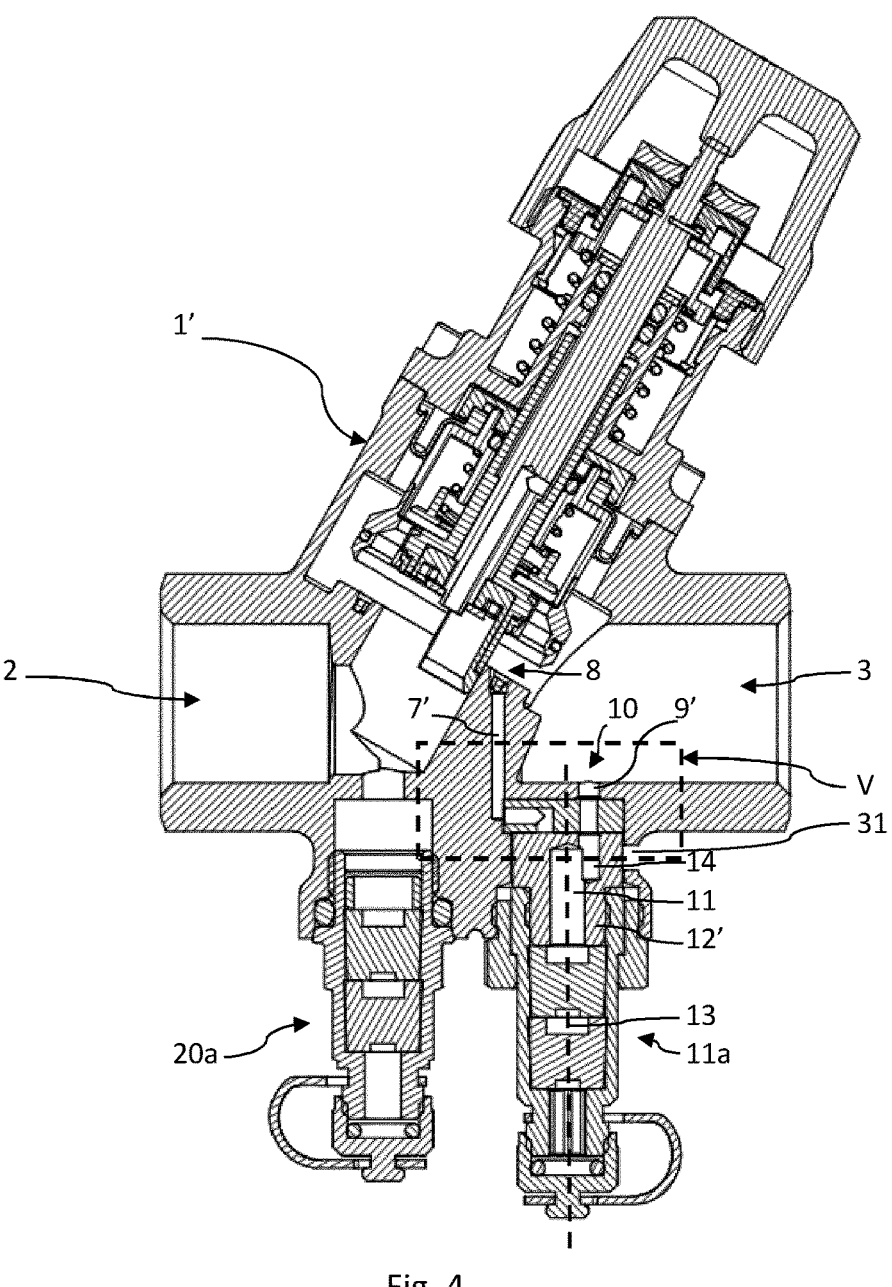
FIG. 4 shows a section through a second embodiment of a valve according to the invention showing a second valve body in a second position.
Figure 5:
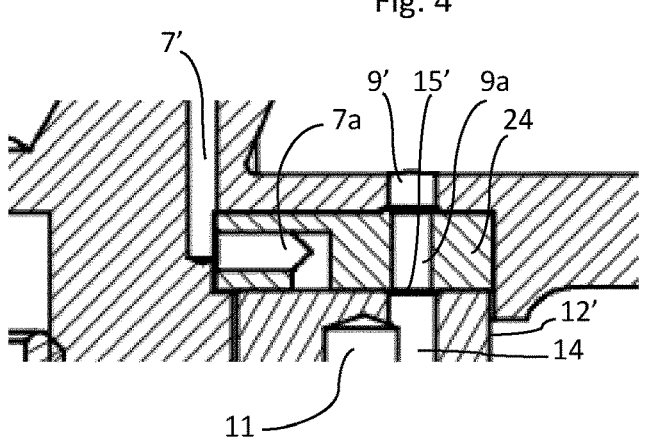
FIG. 5 is an enlarged view of a part of FIG. 4 indicated by V.
Figure 6:
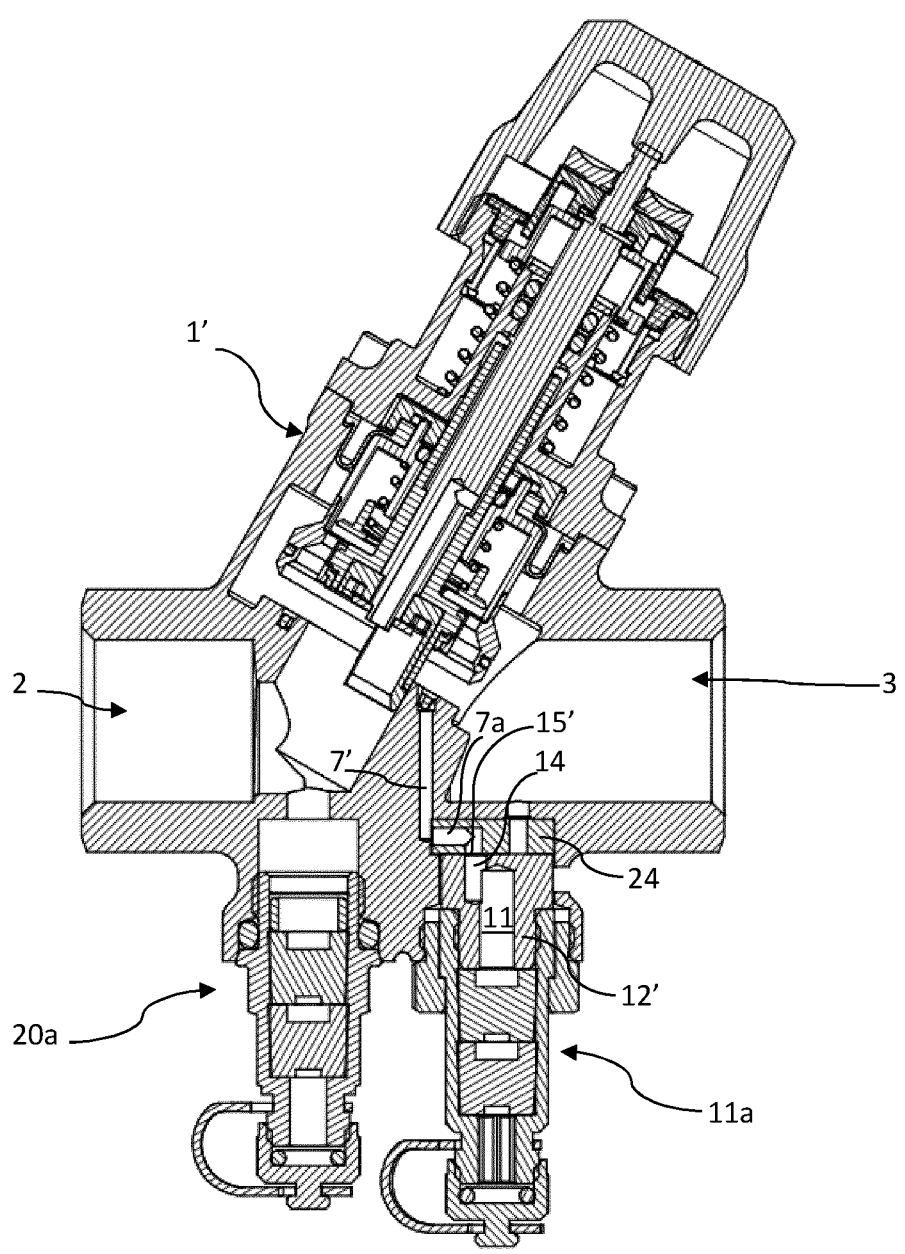
FIG. 6 shows a section through the second embodiment of a valve according to the invention showing the second valve body in a first position.

In the embodiment shown in FIGS. 4 to 6, the mouth 15' is eccentrically provided at an axial end of the second valve body 12', and the axial end of the second valve body 12' is abutting a sealing member 24 comprising a part 7a of the first channel 7' and a part 9a of the second channel 9'. The axial end of the second valve body 12' abuts sealing against the sealing member 24. The mouth 15' is aligned with the part 7a of the first channel 7' in the first position of the second valve body 12, and the mouth 15' is aligned with the part 9a of the second channel 9' in the second position of the second valve body 12'. The sealing member may be of an elastic material, such as artificial or natural rubber.

In both of the embodiments shown, the mouth 15, 15' is provided in an end face of the second valve body 12, 12'. In both of the embodiments shown the second valve body 12, 12' comprises a circular-cylindrical part, and the end face is, in both of the embodiments shown, a plane end face of the circular-cylindrical part extending perpendicular the axis 13.

In the embodiment shown in FIGS. 1 to 3, the first annular sealing member 26 is extending around the circular-cylindrical part of the second valve body 12.

Referring to FIG. 1, and in this respect the two embodiments shown in FIGS. 1 to 3 and in FIGS. 4 to 6 are similar, both of the embodiments shown comprises an adjustable third valve body 16 provided at the fluid path 4 for adjusting a second flow opening 17 of the fluid path 4 at a flow-wise different location than the first flow opening 6.

In both of the embodiments shown in the figures, the first valve body 5 is a pressure maintaining valve body adapted to maintain a generally constant pressure difference over the third valve body 16. The third valve body 16 is a flow adjusting valve body.

The pressure maintaining first valve body 5 is provided by a cup-shaped valve member attached to a rolling diaphragm 113 and a helical spring 137 to be balanced by the force of the spring 137 and a back pressure acting on the rolling diaphragm 113.

The flow adjusting third valve body 16 is attached to a shaft 107 axially displaceable by activation from the outside of the valve housing 1, 1' for adjustment of the corresponding flow opening 17.

The back pressure acting on the rolling diaphragm 113 may be provided by fluid pressure at the inlet 2 acting through a capillary channel 139 extending through part of the shaft 107.

The flow adjusting third valve body 16 comprises a rotatable inner, cylindrical valve member 121 co-axial with an outer, cylindrical valve member 122, both cylindrical valve members having a circumferentially ex-tending cut-out 123, 124, a pre-setting of the flow amount range being established by manual rotation of one valve member in relation to the other to provide a varying overlap of the cut-outs and thus a varying pre-set opening area.

For further details regarding the function of the amount control arrangement and the differential pressure maintaining arrangement reference is made to the above-mentioned WO 2009/135490 A1 and EP 3 708 884 A1. Especially it should be noted that elements designated above by reference numerals "1xx" are found correspondingly in EP 3 708 884 A1 as designated by reference numerals "xx".

The first location 8 is placed flow-wise between the first flow opening 6 and the second flow opening 17, and a third channel 18 is provided to debouch into the fluid path 4 at a third location 19 on a flow-wise different side of the first and the second flow opening 6, 17 than the first and the second location 8, 10. The third channel 18 is in fluid communication with a second measuring chamber 20.

In the embodiments shown, the first flow opening 6 is placed down-stream of the second flow opening 17, the second location 10 is positioned flow-wise down-stream of the first flow opening 6, and the third location 19 is positioned flow-wise up-stream of the second flow opening 17.

As mentioned above the measuring chamber 11 is provided in the PT-plug 11*a* that provides for measuring e.g. pressure inside the control valve. In the embodiments shown the measuring chamber 11 is closed by two flexible bodies 21 of elastomeric material placed one after the other. Access to the measuring chamber 11 may be obtained in a manner known per se by inserting e.g. a cannula through the flexible bodies 21.

In the embodiments shown the second valve body 12, 12' is rotationally fixed to a rotatable measuring plug 22, 22' extending from the valve housing 1, 1'. The measuring chamber 11 is closed by the flexible bodies 21 which in the embodiments shown are accommodated in the rotatable measuring plug 22, 22'. The rotatable measuring plug 22, 22' is provided with an engagement section 23 for engagement with a tool, such as a hexagon key, for rotating the rotatable measuring plug 22, 22'. The measuring plug is rotationally attached to the valve housing 1, 1' by a threaded tubular member 22*a*, 22*a*' with an internal annular shoulder for abutment against a corresponding annular external shoulder of the measuring plug 22, 22'. Further, a slit 31 is provided in the valve housing 1 accommodating a boss (not shown) extending from a circle-cylindrical surface part of the second valve body 12, 12'. The slit 31 has a limited extent in a circumferential direction and thus the boss and the slit 31 in combination on one hand provide end-stops for the rotational movement of the second valve body 12, 12' between the first and the second position and on the other hand provide a visual indication of the rotational position of the second valve body 12, 12'.

The second measuring chamber 20 is in the shown embodiments provided in a second PT-plug 20*a*. The second PT-plug 20*a* comprises a tubular body 32 threaded sealing into a second external recess 33 in the valve housing 1, 1'. Like the measuring plug 22, 22' of the first PT-plug 11*a*, the tubular body 32 accommodates two flexible bodies 21*a* sealing the second measuring chamber 20 while allowing access to the second measuring chamber 20 by inserting e.g. a cannula through the flexible bodies 21*a*.

Both PT-plugs 11*a*, 20*a* are in the embodiments shown, in a manner known per se, provided with a sealing cap 34 threaded to the end of measuring plug 22, 22' and the tubular body 32, respectively.

In use of the control valves shown in the figures, the pressure up-stream of the two flow openings 17 and 6, said pressure being designated P1 may be measured through the second PT-plug 20*a* e.g. by insertion of a cannula in a manner known per se.

By setting the second valve body 12, 12' in the first position the pressure between the two flow openings 17 and 6, said pressure being designated P2 may be measured through the first PT-plug 11*a* e.g. by insertion of a cannula in a manner known per se.

By setting the second valve body 12, 12' in the second position the pressure down-stream of the two flow openings 17 and 6, said pressure being designated P3 may be measured through the first PT-plug 11*a* e.g. by insertion of a cannula in a manner known per se.

Based on the difference between P1 and P2 the flow through the control valve may be calculated as it is known per se in the art.

Based on the difference between P1 and P3 a pump pressure driving a flow through control valve can be optimized for pump energy saving as it is likewise known in the art.

Whereas in the above the invention has been disclosed with reference to the examples shown in the drawings it should be understood that the invention is not limited to these examples, but the skilled person will be able to provide variants within the scope of the invention as defined in the claims and such variants are within the claimed invention.

The invention claimed is:

1. A control valve comprising a valve housing comprising an inlet for connection with a fluid source; and an outlet for connection with a fluid recipient, a fluid path extending from the inlet to the outlet, an adjustable first valve body at the fluid path for adjusting a first flow opening of the fluid path, a first channel debouching into the fluid path at a first location on a stream-wise first side of the first flow opening and a second channel debouching into the fluid path at a second location on a stream-wise opposite side of the first flow opening, and at least a first measuring chamber, the control valve further comprising a second valve body movable between a first position and a second position whereby in the first position the second valve body provides fluid communication between the first channel and the first measuring chamber, and in the second position the second valve body provides fluid communication between the second channel and the first measuring chamber, wherein an adjustable third valve body is provided at the fluid path for adjusting a second flow opening of the fluid path at a flow-wise different location than the first flow opening, and wherein a third channel debouches into the fluid path at a third location on a flow-wise different side of the first and the second flow opening than the first and the second location, the third channel being in fluid communication with a second measuring chamber.

2. A control valve according to claim 1, wherein the second valve body is rotatable around an axis between the first position and the second position.

3. A control valve according to claim 2, wherein the second valve body comprises at least a part of the first measuring chamber and a passage extending from the first measuring chamber to a mouth of the passage in an exterior surface part of the second valve body, said mouth being in the first position of the second valve body in fluid communication with the first channel and said mouth being in the second position of the second valve body in fluid communication with the second channel.

4. A control valve according to claim 3, wherein the mouth is eccentrically provided at an axial end of the second valve body, said axial end of the second valve body being accommodated in an external recess in the valve housing, a first annular sealing member sealing a major space between the external recess and the axial end of the second valve body, a second annular sealing member surrounding an exit of one of the first channel and the second channel, said exit debouching into the external recess, and said second annular sealing member sealing a minor space between the external recess and the axial end of the second valve member at said exit, said minor space being sealed relative to the major space, whereby in one of the first and the second position of the second valve body the mouth is outside the minor space but within the major space and in the other of the first and the second position of the second valve body the mouth is within the minor space.

5. A control valve according to claim 3, wherein the mouth is eccentrically provided at an axial end of the second valve body, and the axial end of the second valve body is abutting a sealing member comprising a part of the first channel and a part of the second channel for the axial end of the second valve body to abut sealing against the sealing member the mouth being aligned with the part of the first channel in the first position of the second valve body and the mouth being aligned with the part of the second channel in the second position of the second valve body.

6. A control valve according to claim 1, wherein one of the first valve body and the third valve body is adapted to maintain a constant pressure difference over the other of the of the first valve body and the third valve body.

7. A control valve according to claim 1, wherein the first measuring chamber is closed by at least one flexible body of an elastomeric material.

8. A control valve according to claim 1, wherein the second valve body is rotationally fixed to a rotatable measuring plug extending from the valve housing.

9. A control valve according to claim 8, wherein the first measuring chamber is closed by at least one flexible body of an elastomeric material, and wherein said at least one flexible body is accommodated in the rotatable measuring plug.

10. A control valve according to claim 8, wherein the rotatable measuring plug is provided with an engagement section for engagement with a tool for rotating the rotatable measuring plug.

11. A control valve comprising a valve housing comprising with an inlet for connection with a fluid source; and an outlet for connection with a fluid recipient, a fluid path extending from the inlet to the outlet, an adjustable first valve body at the fluid path for adjusting a first flow opening of the fluid path, a first channel debouching into the fluid path at a first location on a stream-wise first side of the first flow opening and a second channel debouching into the fluid path at a second location on a stream-wise opposite side of the first flow opening, and at least a first measuring chamber, the control valve further comprising a second valve body movable between a first position and a second position whereby in the first position the second valve body provides fluid communication between the first channel and the first measuring chamber, and in the second position the second valve body provides fluid communication between the second channel and the first measuring chamber;

wherein an adjustable third valve body is provided at the fluid path for adjusting a second flow opening of the fluid path at a flow-wise different location than the first flow opening; and wherein one of the first valve body and the third valve body is a pressure maintaining valve body adapted to maintain a constant pressure difference over the other of the first valve body and the third valve body, said other of the first valve body and the third valve body being a flow adjusting valve body, wherein one of the first location and the second location is placed between the first flow opening and the second flow opening, wherein a third channel debouches into the fluid path at a third location on a flow-wise different side of the first and the second flow opening than the first and the second location, said third channel being in fluid communication with a second measuring chamber, and wherein the second of the first location and the second location is placed on a stream-wise opposite side of said pressure maintaining valve body relative to said one of the first location and the second location, and the third location is placed on a stream-wise opposite side of the flow adjusting valve body relative to said one of the first location and the second location.

12. A control valve according to claim 11, wherein second valve body is rotatable around an axis between the first position and the second position.

13. A control valve according to claim 12, wherein the second valve body comprises at least a part of the first measuring chamber and a passage extending from the first measuring chamber to a mouth of the passage in an exterior surface part of the second valve body, said mouth being in the first position of the second valve body in fluid communication with the first channel and said mouth being in the second position of the second valve body in fluid communication with the second channel.

14. A control valve according to claim 13, wherein the mouth is eccentrically provided at an axial end of the second valve body, said axial end of the second valve body being accommodated in an external recess in the valve housing, a first annular sealing member sealing a major space between the external recess and the axial end of the second valve body, a second annular sealing member surrounding an exit of one of the first channel and the second channel, said exit debouching into the external recess, and said second annular sealing member sealing a minor space between the external recess and the axial end of the second valve member at said exit, said minor space being sealed relative to the major space, whereby in one of the first and the second position of the second valve body the mouth is outside the minor space but within the major space and in the other of the first and the second position of the second valve body the mouth is within the minor space.

15. A control valve according to claim 13, wherein the mouth is eccentrically provided at an axial end of the second valve body, and the axial end of the second valve body is abutting a sealing member comprising a part of the first channel and a part of the second channel for the axial end of the second valve body to abut sealing against the sealing member the mouth being aligned with the part of the first channel in the first position of the second valve body and the mouth being aligned with the part of the second channel in the second position of the second valve body.

16. A control valve according to claim 11, wherein the first measuring chamber is closed by at least one flexible body of an elastomeric material.

17. A control valve comprising a valve housing comprising an inlet for connection with a fluid source; and an outlet for connection with a fluid recipient, a fluid path extending from the inlet to the outlet, an adjustable first valve body at the fluid path for adjusting a first flow opening of the fluid path, a first channel debouching into the fluid path at a first location on a stream-wise first side of the first flow opening and a second channel debouching into the fluid path at a second location on a stream-wise opposite side of the first flow opening, and at least a first measuring chamber, the control valve further comprising a second valve body movable between a first position and a second position whereby in the first position the second valve body provides fluid communication between the first channel and the first measuring chamber, and in the second position the second valve body provides fluid communication between the second channel and the first measuring chamber, wherein an adjustable third valve body is provided at the fluid path for adjusting a second flow opening of the fluid path at a flow-wise different location than the first flow opening, and wherein one of the first location and the second location is placed between the first flow opening and the second flow opening.

18. A control valve according to claim 17, wherein the second valve body is rotatable around an axis between the first position and the second position.

19. A control valve according to claim 18, wherein the second valve body comprises at least a part of the first measuring chamber and a passage extending from the first measuring chamber to a mouth of the passage in an exterior surface part of the second valve body, the mouth being in the first position of the second valve body in fluid communication with the first channel and the mouth being in the second position of the second valve body in fluid communication with the second channel.

20. A control valve according to claim 19, wherein the mouth is eccentrically provided at an axial end of the second valve body, the axial end of the second valve body being accommodated in an external recess in the valve housing, a first annular sealing member sealing a major space between the external recess and the axial end of the second valve body, a second annular sealing member surrounding an exit of one of the first channel and the second channel, the exit debouching into the external recess, and the second annular sealing member sealing a minor space between the external recess and the axial end of the second valve member at the exit, the minor space being sealed relative to the major space, whereby in one of the first and the second position of the second valve body the mouth is outside the minor space but within the major space and in the other of the first and the second position of the second valve body the mouth is within the minor space.

21. A control valve according to claim 19, wherein the mouth is eccentrically provided at an axial end of the second valve body, and the axial end of the second valve body is abutting a sealing member comprising a part of the first channel and a part of the second channel for the axial end of the second valve body to abut sealing against the sealing member the mouth being aligned with the part of the first channel in the first position of the second valve body and the mouth being aligned with the part of the second channel in the second position of the second valve body.

22. A control valve according to claim 17, wherein one of the first valve body and the third valve body is adapted to maintain a constant pressure difference over the other of the first valve body and the third valve body.

23. A control valve according to claim 17, wherein the first measuring chamber is closed by at least one flexible body of an elastomeric material.

24. A control valve according to claim 17, wherein the second valve body is rotationally fixed to a rotatable measuring plug extending from the valve housing.

25. A control valve according to claim 24, wherein the first measuring chamber is closed by at least one flexible body of an elastomeric material, and wherein the at least one flexible body is accommodated in the rotatable measuring plug.

26. A control valve according to claim 24, wherein the rotatable measuring plug is provided with an engagement section for engagement with a tool for rotating the rotatable measuring plug.

* * * * *